Patented Jan. 3, 1950

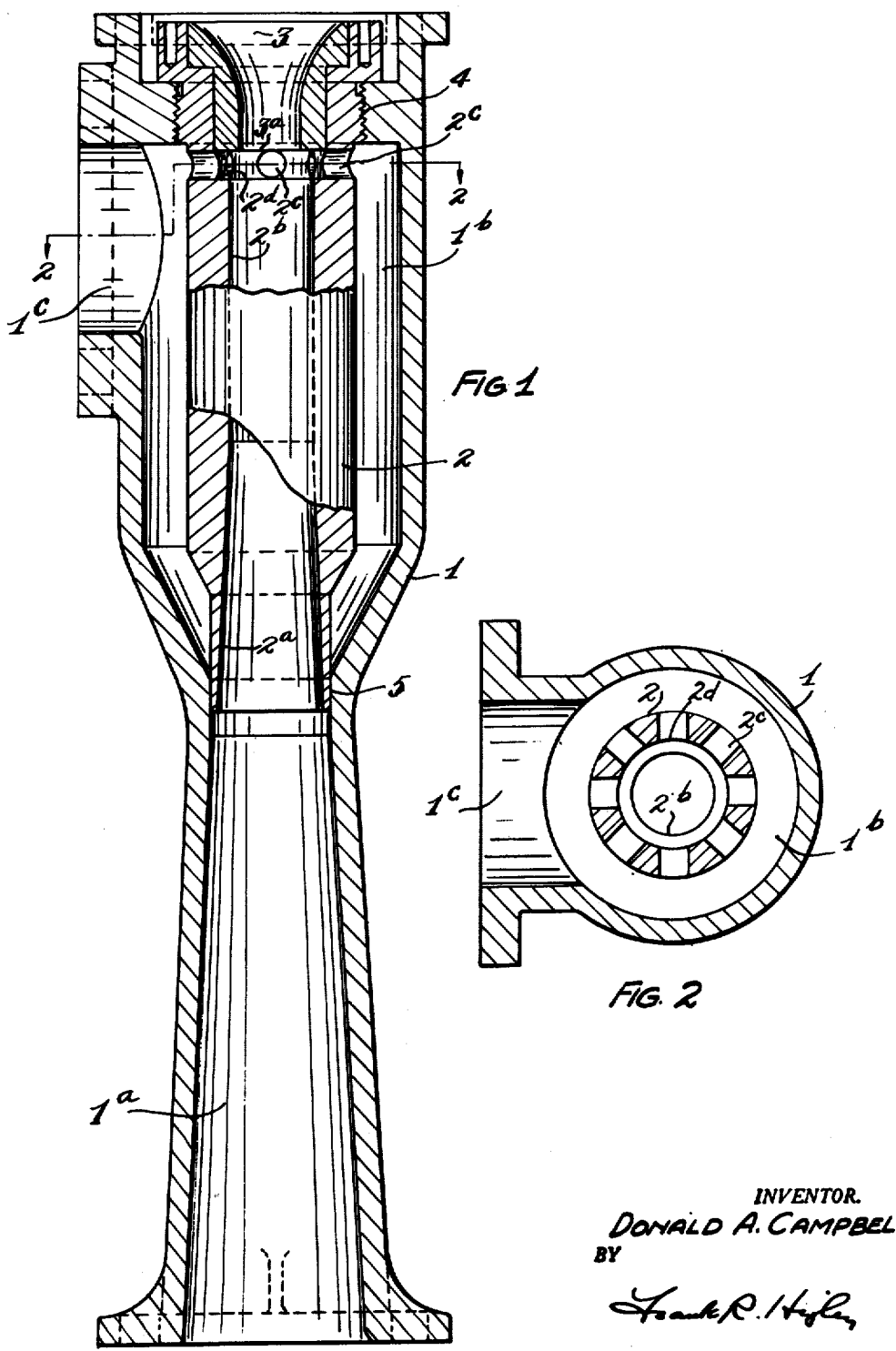

2,493,387

UNITED STATES PATENT OFFICE 2,493,387

FLOW MIXER

Donald A. Campbell, Cleveland, Ohio, assignor, by mesne assignments, to Affiliated Gas Equipment, Inc., Cleveland, Ohio, a corporation of Delaware Application October 8, 1945, Serial No. 620,963

4 Claims. (Cl. 230—95)

This invention relates to an entrainment or mixing device wherein entrainment of a fluid to be entrained is induced by controlled flow of an entraining fluid under substantially higher pressure, the two fluids commingling in the process; there being a conversion of some of the velocity energy present at the inlet end of the device into pressure energy at its outlet.

A typical application of the invention is in connection with industrial gas burners wherein low pressure gas is entrained by air under pressure to produce a combustible mixture of the two fluids.

The objects of the invention are to so proportion and dispose, and otherwise relate the parts, as will appear hereinafter, toward attainment of optimum entrainment, fixed mixture ratio and high mixture pressure, in a simple device having minimum size, and few parts with easy access thereto, and adapted to provide a range of sizes or capacities to meet a range of operating conditions.

Further objects and advantages will be apparent from the following description in connection with the accompanying drawings wherein Figure 1 is a longitudinal section of a gas flow mixer embodying the invention and Figure 2 is a transverse section of the same along the line 2—2.

With reference to the drawings, the device comprises three principal parts, a housing generally indicated at 1; a sleeve generally indicated at 2 and a nozzle insert indicated at 3 carried by seating in a recess in the head-end of the sleeve 2, the sleeve in turn having its head-end secured in the housing 1 as by the threads 4 and having a fit in a recess in the housing at its far end as at 5. These parts all are centrally aligned and have through openings here shown as of circular section, together providing a straight passageway having Venturi characteristics as will appear.

The passageway within the nozzle 3 is of converging characteristics to the throat 3ª at the downstream end thereof.

The sleeve 2 has a downstream end portion of its passageway divergent as at 2ª, the upstream end portion being enlarged with a cylindrical bore 2ᵇ adjacent to the nozzle 3.

The housing 1 may extend downstream substantially beyond the sleeve 2 with its passageway 1ª divergent generally in continuance of the divergent part 2ª of the sleeve. The housing has a cavity 1ᵇ about the sleeve, with a lateral inlet opening 1ᶜ leading thereto; and the sleeve 2 immediately adjacent to the mouth 3ª of its nozzle insert 3 has lateral openings 2ᶜ, providing communication from the cavity 1ᵇ to the central passageway through the parts. The housing 1 at its ends and at its inlet 1ᶜ is flanged as indicated, or otherwise arranged for fluid connection, as will be appreciated by one familiar with the art.

In operation of the example selected for illustration the device will have connection at its upstream end, the top end in Figure 1, with a source of air under pressure, at its side with a fuel gas source, and at its downstream end with burner means.

The proportioning and arrangement of the parts is such that, assuming the described connections to have been made, the air flow will be straight through the device and this will induce gas flow by way of the lateral inlet 1ᶜ, the cavity 1ᵇ, and the openings 2ᶜ, in such proportions that a mixture will emerge from the device at substantial static pressure.

According to my invention, the passageway through the sleeve 2, for optimum performance, is proportioned and arranged as follows:

The sectional area of the cylindrical passageway portion 2ᵇ of the sleeve, is twice that of the jet or stream which emerges from the nozzle 3, taken where the jet is a minimum sectional area—which is usually and practically at the mouth 3ª itself; and the cylindrical portion extends downstream to the location where it is engaged by the jet.

The divergent portion 2ª, is arranged to match the natural divergence of the jet emerging from the nozzle mouth; and more particularly its longitudinal elements would, if prolonged within the cylindrical enlarged portion 2ᵇ, meet the periphery of the nozzle mouth 3ª, and the pitch of the divergence taper is such that these elements are disposed substantially at and along the external surface of the jet within the enlarged portion—this being in the order of 1½ inches per foot.

The arrangement is such that in operation the external surface of the jet, within the enlarged cylindrical passage portion 2ᵇ, will form a cone, of which the conical passage portion 2ª forms a continuation; whereby the lateral openings 2ᶜ lead to an annular space which is externally cylindrical and bounded by the wall 2ᵇ, internally conical and there bounded by the jet itself, and which extends longitudinally with diminishing volume but increasing internal diameter, from the nozzle mouth 3ª downstream to the matching upstream end of the divergent portion 2ª.

Hence in operation, entrainment is had within the passage portion $2^b$, whereas conversion of velocity to static pressure is had within the divergent portion $2^a$; with maximum entrainment effect through the long conical area of contact between the surrounding fluid to be entrained and the surrounded entraining fluid jet, and with minimum loss of energy in flow from the cylindrical portion $2^b$ to the divergent portion $2^a$.

I have found that the described 2 to 1 relation in sectional area between enlarged portion $2^b$ and the nozzle mouth $3^a$, together with the pitch of the divergent portion $2^a$, are very considerably more important than that the elements of the taper meet the periphery of the nozzle mouth as described above; and that with the same disposition of the divergent wall $2^a$, cylindrical portions $2^b$ and nozzle mouths $3^a$ of substantially greater diameters than those described above, may be successfully employed provided the described 2 to 1 relationship of their sectional areas is maintained. Thus in practice, a series of nozzle inserts 3 having a range of mouth openings from $\frac{1}{16}$ to $\frac{5}{8}$ inches in diameter, may be employed with a series of sleeves 2 having a range of straight portions $2^b$ varying from $\frac{1}{16}$ to $\frac{7}{8}$ inches in diameter, the sleeves having the same exterior dimensions and being machined with the same taper bore and differing only in the diameter of the cylindrical bore $2^b$ to which they may be subsequently machined to match their nozzle inserts.

It will be observed that in each assembly of such series, the cylindrical portion of the passageway extends downstream at least to the location where it is engaged by the jet from its nozzle, and the pitch of divergence of the conical portion being the same in all, is at least that of the jet within the cylindrical portion.

I have determined and found that when the above described conditions are met in the sleeve 2, the performance characteristics, and particularly the entrainment attained and the relative outlet pressure is substantially superior than with devices of the prior art. For any set of given other conditions, the amount of entrainment is practically wholly dependent upon the weight of air fed, the mixture ratio remaining substantially constant over a wide range of air pressure.

The head-end of the sleeve 2 in the zone of the openings $2^c$ may be enlarged as at $2^d$ to aid distribution of the gas about the nozzle jet with no apparent effect other than beneficial upon the operation above described. Preferably, the diameter at the enlargement $2^d$ is the same as at the adjacent fit of the nozzle insert 3 so that in manufacture the enlargement is had without extra machining operation.

The nozzle insert 3 may be permanently mounted in its sleeve 2 as by a press fit. It may be noted that the enlarged head part of the nozzle insert is disposed within the enlarged head part of the sleeve insert 2 so that longitudinal dimension is conserved; and that the insert assembly is easily removable through the inlet-end of the housing. Also, it will be noted that the longitudinal dimension is otherwise conserved because the divergent part of the passageway is of less length than heretofore necessary due to the more efficient entrainment and mixing described.

For a slightly cheaper construction, the sleeve 2 and nozzle 3 parts may be made integral with each other instead of separately constructed as illustrated. In such event, the bore $2^b$ in the sleeve will extend lengthwise to the nozzle mouth, the enlargement $2^d$ being thus simply omitted and the openings $2^c$ discharging directly into the bore $2^b$ immediately adjacent the nozzle mouth $3^a$.

In summary, it should be apparent from the foregoing that whether the nozzle and sleeve parts are integral or not they together form a conduit body, as for mounting in the usual housing 1 of an entrainment device, the body having a straight-through passageway of Venturi characteristics, the passageway including a convergent nozzle portion to be supplied with entraining fluid and terminating at the nozzle mouth $3^a$, a divergent portion $2^a$ downstream of the nozzle, and a non-divergent portion $2^b$ between the nozzle and divergent portions, and the body having a lateral inlet to said non-divergent portion adjacent the mouth of the nozzle portion, for fluid to be entrained.

Also, the characteristic sectional area of the non-divergent portion $2^b$ is twice that of the nozzle jet, at its smallest part, which is approximately at or immediately downstream of, and hence the same as, the nozzle mouth $3^a$ area; the enlargement $2^d$ immediately downstream of the nozzle mouth being optional. The non-divergent portion $2^b$ intersects the divergent portion $2^a$ at a location determined by the sectional area of the non-divergent portion, which in turn is determined by the sectional jet area produced by the nozzle portion.

Generally, the passageway through the body operates with Venturi effect, the mouth $3^a$ of the nozzle portion corresponding with the throat of the conventional Venturi passageway, the portion $2^b$ herein however, providing a clearance space about the jet emerging from the mouth, in the zone of its maximum velocity, such space being annular and effectively of gradually diminishing sectional area, relative to the jet, which of course is of gradually increasing sectional area, with approach to the divergent body portion $2^a$.

What I claim is:

1. In an entrainment device of the class described, body means having a straight through passageway, said passageway having a nozzle portion for entraining gas, with a convergent approach thereto, a cylindrical portion of twice the sectional area of the mouth of said nozzle portion, into one end of which said nozzle discharges and terminating at its downstream end at the location where it is engaged by the jet from said nozzle, and a portion extending therefrom downstream with the same divergence as that of said jet within said cylindrical portion, and said body means having openings for a gas to be entrained leading into said cylindrical portion adjacent said nozzle portion.

2. In an entrainment device of the class described, body means having a straight through passageway, said passageway having a nozzle portion for entraining gas, with a convergent approach thereto, a cylindrical portion of twice the sectional area of the mouth of said nozzle portion, into one end of which said nozzle discharges, and terminating at its downstream and adjacent the location where it is engaged by the jet from said nozzle, and a conical portion extending downstream from said cylindrical portion with the same pitch of divergence as that of said jet within said cylindrical portion, and said body means having passageway for a gas to be entrained leading into said cylindrical portion adjacent said nozzle portion.

3. In an entrainment device of the class described, body means having a straight through passageway, said passageway having a nozzle portion for entraining gas, with a convergent approach thereto, a cylindrical portion of twice the sectional area of the mouth of said nozzle portion, into one end of which said nozzle discharges and terminating at its downstream end at the location where it is engaged by the jet from said nozzle, and a conical portion extending therefrom downstream with at least the same pitch of divergence as that of said jet within said cylindrical portion, and said body means having openings for a gas to be entrained leading into said cylindrical portion adjacent said nozzle portion.

4. In an entrainment device of the class described, a housing having a straight through opening, with an enlarged recess at one end thereof, an enlarged cavity adjacent said recess, and a lateral opening leading to said cavity, a sleeve having a head seating in said housing recess and itself having a recess, said sleeve extending through said housing cavity, and a nozzle insert having a head seating in said sleeve cavity, said sleeve and nozzle insert forming body means having a straight through passageway, the nozzle insert portion of said passageway having a mouth with a convergent approach thereto for discharge into said sleeve, said sleeve having a cylindrical passage portion adjacent said mouth and of twice its sectional area, with a divergent portion extending downstream from said cylindrical portion, and said sleeve having lateral openings for gas to be entrained leading from said housing cavity into said cylindrical passage portion adjacent said nozzle insert.

DONALD A. CAMPBELL.

REFERENCES CITED

The following references are of record in the file of this patent:

UNITED STATES PATENTS

| Number | Name | Date |
|---|---|---|
| 284,962 | Huston | Sept. 11, 1883 |
| 1,671,464 | Brombacher | May 29, 1928 |
| 1,822,992 | Jones | Sept. 15, 1931 |
| 1,878,478 | Ensign et al. | Sept. 20, 1932 |
| 2,117,944 | Cochrane | May 17, 1938 |
| 2,180,259 | Sargent | Nov. 14, 1939 |
| 2,321,483 | Haedike | June 8, 1943 |
| 2,378,839 | Ensign et al. | June 19, 1945 |